United States Patent [19]

Edelen et al.

[11] Patent Number: 4,614,126
[45] Date of Patent: Sep. 30, 1986

[54] POWER SYNCHRONIZER

[75] Inventors: Stephen A. Edelen, Battle Creek; Timothy J. Morscheck, Kalamazoo, both of Mich.

[73] Assignee: Eaton Corporation, Cleveland, Ohio

[21] Appl. No.: 732,991

[22] Filed: May 13, 1985

[51] Int. Cl.[4] .............................................. F16H 3/08
[52] U.S. Cl. .......................................... 74/333; 74/363
[58] Field of Search ................. 74/330, 362, 363, 365, 74/375, 333, 760

[56] References Cited

U.S. PATENT DOCUMENTS

| | | | |
|---|---|---|---|
| 3,105,395 | 10/1963 | Perkins | 74/331 |
| 3,283,613 | 11/1966 | Perkins | 74/331 |
| 3,478,851 | 11/1969 | Smyth et al. | 74/339 |
| 3,736,806 | 6/1973 | Banks | 74/336 |
| 3,834,499 | 10/1974 | Candellero et al. | 74/339 |
| 4,023,443 | 5/1977 | Usui et al. | 74/336 R |
| 4,361,060 | 11/1982 | Smyth | 74/752 A |
| 4,375,172 | 3/1983 | Richards et al. | 74/339 |
| 4,549,443 | 10/1985 | White | 74/333 |

OTHER PUBLICATIONS

Mechanisms, Linkages, and Mechanical Controls, Chironis pp. 248–251 Planetary Gear Systems, Glover, Apr. 1982 top ½ of p. 251.

Primary Examiner—Lawrence Staab
Assistant Examiner—Martin G. Belisario
Attorney, Agent, or Firm—C. H. Grace; H. D. Gordon

[57] ABSTRACT

A power synchronizer assembly (10) for selectively increasing the rotational speed of a mechanical change gear transmission (12) input shaft (22), main section countershaft (58) and ratio gears (82, 84, 86, and 88) independently of the rotational speed of the drive engine (14) is provided. The power synchronizer assembly includes a sun gear shaft (174) drivingly associated with the main section countershaft and carrying a sun gear (176) fixed thereto which is in constant engagement with the planet gears (180) of a planet gear carrier (178) rotatably driven by the transmission output shaft (28). A ring gear (182) surrounds and is in constant engagement with the planet gears and is selectively frictionally coupled for rotation with the transmission housing (68) by means of a band brake and band brake operating mechanism (186 and 188).

37 Claims, 12 Drawing Figures

POWER SYNCHRONIZER

BACKGROUND OF THE INVENTION

1. Field of the Invention

The present invention relates to power sychronization assemblies for automatic or semi-automatic change gear mechanical transmissions. In particular, the present invention relates to an improved, compact structure for a power synchronization device for selectively accelerating the rotational speed of input shaft driven transmission members independent of the rotational speed of the prime mover. The device may also include means for selectively decelerating such transmission members.

2. Description of the Prior Art

Manually shifted, non-synchronized, nonblocked, mechanical, constant mesh change gear transmissions, usually for driving a land vehicle from a prime mover such as an Otto cycle or diesel engine, are well known in the prior art. Examples of such transmissions may be seen by reference to U.S. Pat. Nos. 3,105,395; 3,138,965; 3,283,613 and 3,611,823, the disclosures of which are hereby incorporated by reference. This type of transmission utilizes selectively engageable positive or jaw clutches. Positive clutches of this type are relatively compact and inexpensive as compared to friction clutches, synchronized clutches and/or blocked clutches and are very reliable if utilized in connection with some type of synchronizing means.

Conventional, individually sychronized and/or blocked positive clutch structures are well known in the prior art as may be seen by reference to U.S. Pat. Nos. 3,221,851; 3,929,029; 4,307,624; 4,497,396; 3,799,002; 4,428,469 and 4,132,122, the disclosures of which are hereby incorporated by reference. Conventional individual synchronizing devices, while providing easy shifting of gears in a transmission, require a relatively large space in the transmission housing and, due to the relatively limited space available within a transmission housing are of a relatively limited capacity and/or life. This is especially true for transmissions utilized with heavy duty vehicles wherein the torque transfer capacities and inertias involved are relatively great. Individual blocked positive clutch assemblies, while providing relatively easy shifting of the transmission, do require a certain degree of skill to cause a crossing of synchronization and further are more complicated and space consuming than a conventional nonsynchronized nonblocked jaw clutch assembly.

Synchronizing of conventional nonsynchronized, nonblocked jaw clutch assemblies by operator manipulation of engine speed, usually involving the use of an input shaft or engine brake and "double clutching", is a highly efficient, well known and widely used transmission shifting method. However, such manual synchronizing of mechanical transmissions requires a high degree of operator skill, effort and attention and thus may not be suitable for situations where unskilled operators may be utilized and/or the operator's attention is best directed to other matters such as to vehicle operation in a highly congested traffic situation.

Automatic mechanical transmission systems wherein electronic central processing units are utilized to automatically cause synchronization of positive jaw clutches by automatic manipulation of engine speed and the vehicle master clutch are also known in the prior art as may be seen by reference to U.S. Pat. No. 4,361,060, the disclosure of which is hereby incorporated by reference. Such control systems are best suited for a fully automatic transmission system and not for a semi-automatic transmission system, require rather complicated engine and master clutch controls and further, when synchronizing the jaw clutches for a downshift, are limited by the engine governed speed, acceleration and response times as to speed, acceleration and response time of the transmission input shaft driven jaw clutch members.

Power synchronizing devices, i.e. devices for accelerating, and possibly decelerating, the rotational speed of transmission elements such as shafts, gears and jaw clutch members rotatably driven by the input shaft of a nonconventionally synchronized mechanical change gear transmission independently of the speed of the drive engine are known in the prior art. Examples of such power synchronizing devices may be seen by reference to U.S. Pat. Nos. 3,478,851; 3,736,806 and 4,023,443, the disclosures of which are hereby incorporated by reference. The known prior art devices have required an auxiliary external power source, have required major modification of the host transmission and/or have been limited by the transmission gear ratios as to acceleration and/or maximum rotational speed of the input shaft driven transmission elements for purposes of synchronizing same with the main shaft or output shaft during a downshift.

It has proven difficult to package a downshift power synchronizing device without making major modifications to the host transmission. The reason for this is that standard transmissions, especially for heavy duty trucks, tend to be highly optimized packages with component densities that are very high in order for the transmission to fit between the vehicle frame rails or within the compartmental constraints of a vehicle and still allow for standard add-on features such as power take-offs, shift linkages and the like. No commercially available production power synchronizing device is known to exist at this time.

SUMMARY OF THE INVENTION

In accordance with the present invention, the drawbacks of the prior art are minimized or overcome by the provision of a power synchronizer mechanism suitable for selectively accelerating transmission input shaft driven transmission elements for purposes of achieving synchronization during a downshift, which mechanism is independent of the rotational speed of the prime mover or drive engine and is suitable for use with automatic and/or semi-automatic transmissions. The power synchronizing device may also be suitable for decelerating the transmission elements for purposes of achieving synchronization of jaw clutch elements during a transmission upshift. To achieve jaw clutch member synchronization during the downshift, the power synchronizer device selectively clutches the input shaft, or a transmission element drivingly engaged thereto, to the output shaft through a speed increasing planetary gear set whereby some of the kinetic energy stored in the moving mass of the vehicle is transferred to the input shaft. Other than for actuation, the power synchronizing mechanism requires no auxiliary power source and is suitable for attachment to an existing mechanical change gear transmission with a minimum of modification thereto.

The above is accomplished by utilizing a planetary gear set and a brake band and brake band actuating mechanism combined to create a low profile downshift power synchronizer assembly. The assembly may also include mechanism for upshift synchronization. The power synchronizing mechanism is especially well suited for compound transmissions of the type comprising a main transmission section connected in series with an auxiliary transmission section. The power synchronizer mechanism includes a sun gear shaft carrying a sun gear fixed for rotation therewith. The sun gear shaft is in rotational driving connection with a main transmission section countershaft and preferably is coaxial with and splined for direct rotation with the main section countershaft. A planet carrier including a plurality of planet gears constantly meshed with the sun gear is rotatably supported about the sun gear shaft and is constantly driven by the transmission output shaft. Preferably, the planet carrier carries a gear in constant mesh with a gear fixed for rotation with the output shaft.

A ring gear surrounds the planet gears and is in constant mesh therewith. The ring gear is rotatably supported about the sun gear shaft and may be selectively grounded to the transmission housing by means of a band brake mechanism surrounding the exterior of the ring gear and grounded to the transmission housing. If desired, the sun gear or sun gear shaft may also carry frictional means selectively frictionally engageable with cooperating friction means fixed to the transmission housing for purposes of decelerating the transmission main section countershaft and all transmission elements drivingly connected thereto for purposes of achieving synchronization during a transmission upshift.

Preferably, to achieve and maintain exact or substantial synchronization of the clutch members of the jaw clutch to be engaged, the band brake and/or the friction means used to ground the sun gear shaft to the transmission housing are controlled in a modulated manner by an electronic control unit. Control of the brake band and/or friction means may involve the use of actuators responsive to pulse width modulation or the like.

Accordingly, it is an object of the present invention to provide a new and improved power synchronizing mechanism.

A further object of the present invention is to provide a new and improved power synchronizing mechanism suitable for use with automatic and/or semi-automatic mechanical change gear transmissions, requiring no auxiliary external driving power source, not limited by the existing drive ratios of the transmission and of a relatively compact size suitable for addition to a standard transmission, especially a compound change gear transmission, with a minimum of modification thereto.

These and other objects and advantages of the present invention will become apparent from a reading of the description of the preferred embodiments taken in connection with the attached drawings.

DESCRIPTION OF THE PREFERRED EMBODIMENT

Certain terminology will be used in the following description for convenience and reference only and will not be limiting. The words "upwardly", "downwardly", "rightwardly" and "leftwardly" will designate directions in the drawings to which reference is made. The words "inwardly", and "outwardly" will refer to directions towards and away from, respectively, the geometric center of the described device and/or designated parts thereof. Said terminology will include the words above specifically mentioned, derivatives thereof, and words of similar inport.

Figures 1, 2:
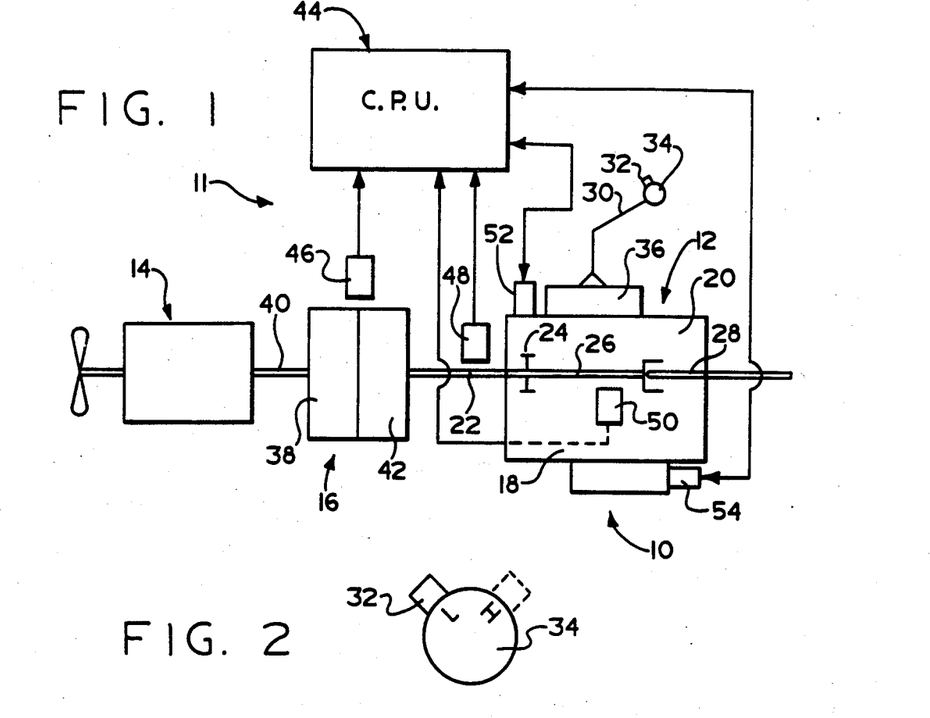
FIG. 1 is a schematic illustration of a semi-automatic mechanical transmission system utilizing the power synchronizing mechanism of the present invention.
FIG. 2 is a top view of the knob or handle of the shift lever utilized to manually shift the semi-automatic compound mechanical transmission of FIG. 1.

The power synchronizing mechanism 10 of the present invention is intended for use in system 11 with a mechanical change gear transmission 12 as part of the drive train of a land vehicle which also includes a prime mover such as drive engine 14 and a nonpositive coupling such as master friction clutch 16 interposed the drive engine and change gear transmission, but is not limited to such use.

While the power synchronizing mechanism 10 of the present invention is well suited for use with fully automatic mechanical transmission systems of the type illustrated and described in above mentioned U.S. Pat. No. 4,361,060, it will be described as utilized with a semi-automatic mechanical compound change gear transmission of the type comprising a main transmission section 18 connected in series with an auxiliary transmission section 20. Transmissions of this type are well known in the prior art and examples thereof may be seen by reference to U.S. Pat. Nos. 3,105,395; 3,138,965; 3,283,613 and 3,799,002, the disclosures of which are hereby incorporated by reference. Briefly, such transmissions typically comprise an input shaft 22 carrying an input gear 24 for rotation therewith, a main shaft 26 and an output shaft 28 which is typically drivingly connected with the input of a drive axle, transfer case or the like.

Transmission 12 is considered to be semi-automatic in that the rotational speeds of the clutch members of the positive jaw clutches utilized to selectively engage various drive ratios between the input shaft and the main shaft are automatically synchronized by the power synchronizing mechansim 10 and, preferably, movement of the jaw clutch members into meshing engagement is automatically prevented until such synchronization between the clutch members is achieved. Other than the synchronization and/or blocking function, the remainder of the operation of the transmission system may be manual with the operator controlling the supply of fuel to engine 14, engagement and/or disengagement of master clutch 16 and selection of when, and to which gear ratio, the transmission should be shifted. Manual shifting is by means of shift lever 30, auxiliary section shifting button 32 on shift lever knob 34 and shift rail housing assembly 36.

Manually operated master friction clutch 16 includes a first friction member 38 driven by the engine output or crankshaft 40 and a second friction member 42 fixed for rotation with the transmission input shaft 22. A manually operated clutch pedal (not shown) is used to selectively engage and disengage master clutch 16 which is preferably spring biased to the normally engaged condition. A control or central processing unit 44, preferably an electronic microprocessor based unit, receives inputs from a sensor 46 indicating the engaged or disengaged condition of master clutch 16, from a sensor 48 providing a signal indicative of the rotational speed of input shaft 22 and the transmission elements driven thereby and from a sensor 50 providing a signal indicative of the rotational speed of the transmission main shaft 26. Central processing unit also may receive signals from shift rail housing assembly sensor/blocker actuator 52 indicative of the present condition of the shift rail housing and of the gear ratio desired to be selected by the operator. Sensor 52 may also be an actuator receiving command signals from central processing unit 44 to selectively block axial movement of the shift rails until synchronous rotation of the jaw clutch members associated with a desired gear ratio has been achieved. Synchronizing mechanism sensor/actuator 54 receives command outputs from processing unit 44 to selectively cause synchronous rotation of the jaw clutch members of a desired gear ratio and may also provide input signals to the central processing unit indicative of the present operational condition of the power synchronizing mechanism 10.

Central processing units for receiving inputs, processing such inputs in accordance with predetermined logic rules, and issuing command outputs are known as may be seen by reference to U.S. Pat. No. 4,361,060, the disclosure of which is hereby incorporated by reference.

As will be described in greater detail below, assuming the operator has disengaged master clutch 16 and selected, by means of the shift lever 30, a downshift in the main transmission section 18, by disengaging the jaw clutch members associated with the previously engaged gear ratio and movement of the shift rail and jaw clutch members of the desired ratio toward engagement, sensor/actuator 52 will provide a signal to central processing unit 44 indicative of the ratio desired to be engaged and preferably will be commanded to block or inhibit further axial movement of the desired shift rail and jaw clutch members towards engagement. Central processing unit 44 will compare the input signals from sensors 48 and 50 indicative of the rotational speeds of the input shaft 22 and main shaft 26, respectively, factored by the ratio of rotational speeds therebetween required to achieve synchronous rotation of the selected jaw clutch members as discussed in above mentioned U.S. Pat. No. 4,023,443, and determine if acceleration of the input shaft 22 is required. If acceleration of the input shaft 22 is required, and preferably only if the master clutch 16 remains disengaged, the power synchronizing mechanism 10 will be actuated by means of a command signal to sensor/actuator 54 to drivingly connect the output shaft 28 to the input shaft 22 by means of a speed increasing planetary gear set to be described in greater detail below. As synchronization of the desired jaw clutch is sensed, the sensor/actuator 52 will be commanded to cease blocking axial movement of the shift rails.

A source of electrical power (not shown) and/or pressurized fluid (not shown) is also a portion of the illustrated system.

As used herein, a "lower" gear ratio or drive ratio will refer to a drive ratio having a higher ratio of input shaft speed to output shaft speed. For example, assuming a ten (10) forward speed transmission, tenth (10th) gear is higher than ninth (9th) gear and a shift from tenth (10th) gear to ninth (9th) gear is a downshift.

Figure 3:
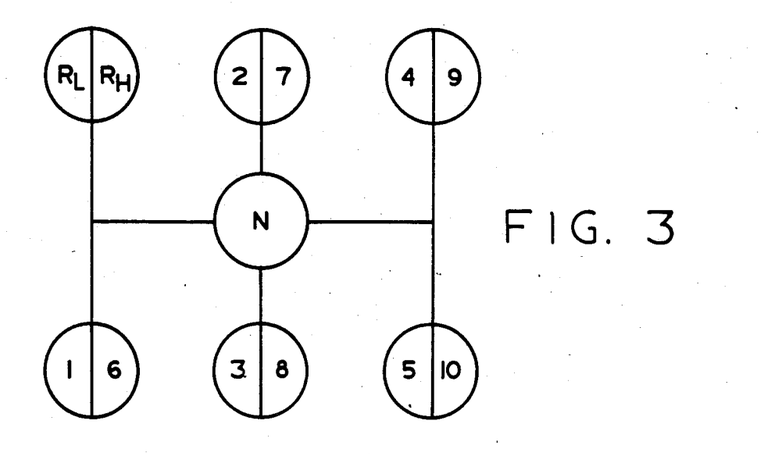
FIG. 3 is a schematic illustration of the shift pattern of the semi-automatic mechanical compound transmission of FIG. 1.
Figure 4:
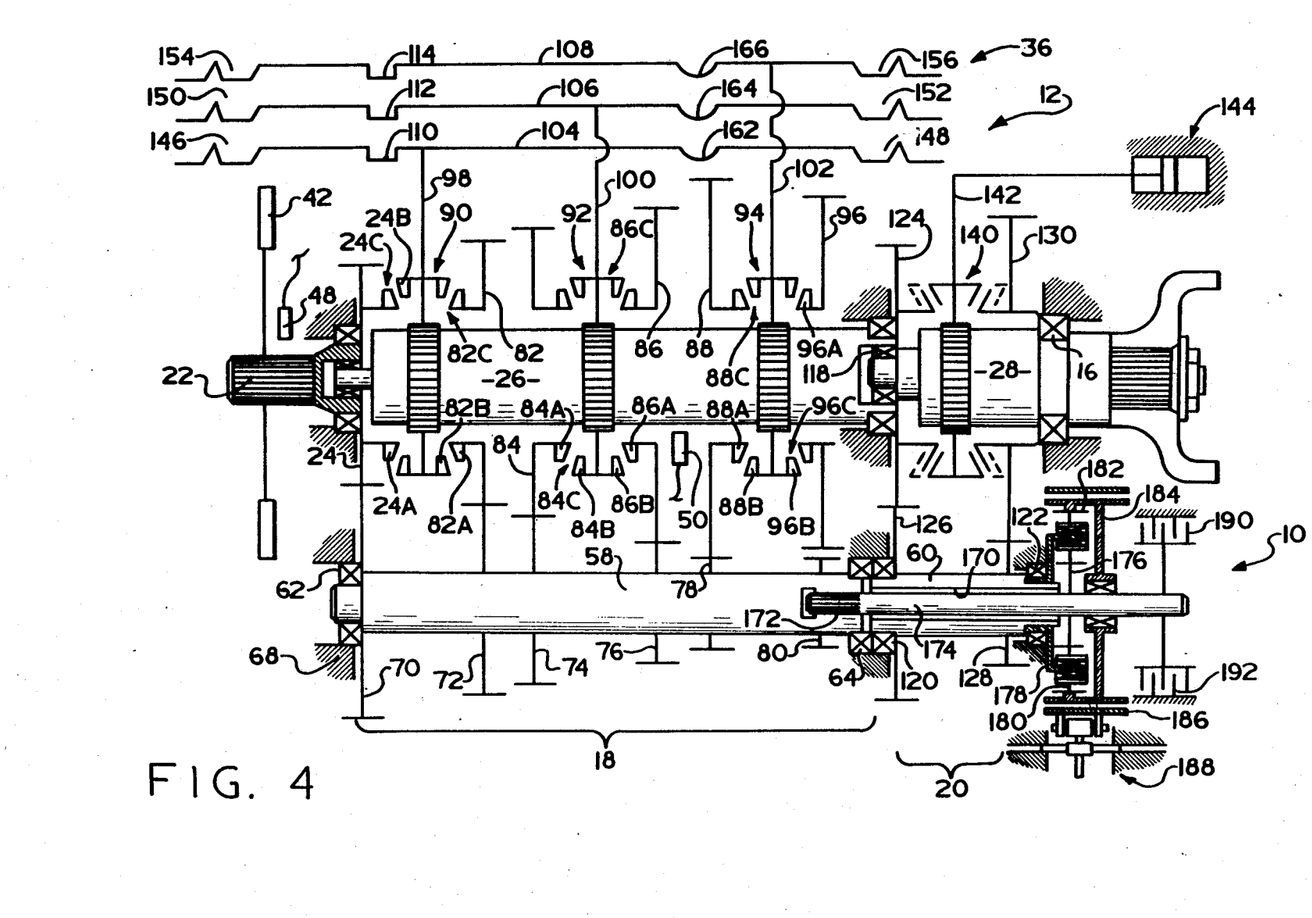
FIG. 4 is a schematic illustration of one embodiment of the power synchronizing mechanism of the present invention as utilized with compound mechanical transmissions wherein the front and auxiliary section countershaft are coaxially aligned.

One embodiment of power synchronizer mechanism 10 of the present invention as utilized with a manually shifted, semi-automatic mechanical transmission 12 may be seen schematically by reference to FIG. 4. Compound transmission 12 comprises a main section 18 having five (5) selectable forward drive ratios and a reverse ratio and an auxiliary section 20, connected in series with the main section 18, having two (2) selectable drive ratios. The shift knob 34 and auxiliary shift button 32 utilized to manually shift transmission 12 and the shift pattern for shifting transmission 12 may be seen by reference to FIGS. 2 and 3, respectively. Although power synchronizing mechanism 10 is illustrated as utilized with a compound transmission of the range type, it is understood that the power synchronizing mechanism of the present invention may be advantageously utilized with compound transmissions of the splitter type and/or with simple transmissions.

The compound transmission 12 illustrated in FIG. 4 is of the type wherein the main section countershaft or countershafts 58 are coaxially aligned with the auxiliary section countershaft or countershafts 60. Transmission 12 is of a relatively standard design and is preferably of the twin countershaft type only one of which countershaft, 58 and 60, in the main and auxiliary sections, 18 and 20, respectively, is shown. Examples of such transmissions having coaxially aligned main section and auxiliary section countershafts may be seen by reference to above mentioned U.S. Pat. Nos. 3,105,395 and 3,138,965.

Transmission 12 includes input shaft 22 to which friction member 42 of master clutch 16 is fixed for rotation therewith and which additionally carries input gear 24 nonrotatably attached thereto. The main section 18 has a main section countershaft 58 supported by bearings 62 and 64 for rotation in transmission housing 68. Main section countershaft 58 is substantially parallel to main shaft 26 and is provided with countershaft gears 70, 72, 74, 76, 78 and 80 fixed for rotation therewith. A plurality of main shaft gears, also called ratio gears, 82, 84, 86 and 88 surround the main shaft 26 and are selectively clutchable thereto, one at a time, by double sided positive jaw clutch collars 90, 92 and 94. Jaw clutch collar 90 may also clutch the input shaft 22 directly to the main shaft 26 while jaw clutch collar 94 may clutch reverse main shaft gear 96 to the main shaft 26.

The mainshaft gears 82, 84, 86 and 88 circle the main shaft and are in continuous meshing engagement with, and are preferably supported by, opposed pairs of countershaft gears 72, 74, 76 and 78 which mounting means and the special advantages resulting therefrom are explained in greater detail in above mentioned U.S. Pat. Nos. 3,105,395 and 3,335,616. Reverse main shaft gear 96 is in continuous meshing engagement with countershaft gear 80 by means of conventional intermediate idler gears (not shown). The forwardmost countershaft gear 70 is continously meshed with and driven by input gear 24 for causing rotation of countershaft 58 whenever the input gear is rotatably driven. Main shaft gears 82, 84, 86, 88 and 96, countershaft gears 70, 72, 74, 76, 78 and 80, and the unshown idler gear are all constantly meshed with and driven by the input gear 24 and thus, in combination, form the input gearing of transmission 12. Input gear 24 and main shaft gears 82, 84, 86, 88 and 96 carry jaw clutch teeth 24a, 82a, 84a, 86a, 88a and 96a, respectively, for rotation therewith which teeth or jaw clutch members, in combination with the input gearing, comprise the transmission elements driven by the input shaft 22.

Clutch collar 90 carries positive jaw clutch teeth 24b and 82b which are engageable with clutch teeth 24a and 82a, respectively, to define positive jaw clutches 24c and 82c, respectively. Clutch collar 92 carries positive jaw clutch teeth 84b and 86b which are engageable with jaw clutch teeth 84a and 86a, respectively, to define positive jaw clutches 84c and 86c, respectively, jaw clutch collar 94 carries jaw clutch teeth 88b and 96b which are positively engageable with jaw clutch teeth 88a and 96a, respectively to define positive jaw clutches 88c and 96c, respectively.

As is known in the prior art, each of the clutch collars 90, 92 and 94 are preferably directly or indirectly splined to the main shaft 26 for rotation therewith and axial movement relative thereto. Other mounting means for the clutch collars are known in the prior art and are intended to be included within the scope of the present invention. Each of the clutch collars 90, 92 and 94 is provided with means for receiving a shift fork or shift yoke 98, 100 and 102, respectively, whereby the clutch collars are axially moved, one at a time only, from the positions illustrated in FIG. 4.

A shift bar housing assembly 36 is provided for manual manipulation of the clutch collars for shifting of the main transmission section 18. The shift rail housing assembly 36, also known as a shift bar housing assembly, comprises a plurality of substantially parallel axially moveable shift rails 104, 106 and 108 to which are axially fixed the shift forks 98, 100 and 102, respectively. Each of the shift rails 104, 106 and 108 is provided with a shift notch or shift block member 110, 112 and 114, respectively, for engagement by the end of a conventional shift lever, such as shift lever 30, or shift finger of a shift shaft as is well known in the prior art.

The auxiliary transmission section 20 includes output shaft 28 which is preferably coaxial with input shaft 22 and main shaft 26 and is supported for rotation in housing 68 by means of bearings 116 and 118. The auxiliary section also includes a auxiliary section countershaft 60 supported for rotation in housing 68 by means of bearings 120 and 122. Fixed for rotation with main shaft 26 is the auxiliary section drive gear 124. Auxiliary section countershaft 60 carries auxiliary section countershaft gears 126 and 128 fixed for rotation therewith. Auxiliary section countershaft gear 126 is constantly meshed with auxiliary section input gear 124 while auxiliary section countershaft gear 128 is constantly meshed with output gear 130 which surrounds the output shaft 28. A synchronized clutch structure 140, of conventional individually synchronized jaw clutch design, is utilized to selectively clutch main shaft 26 and auxiliary drive gear 124 directly to the output shaft 28 for a direct drive connection between the main shaft 26 and output shaft 28 or to clutch output gear 130 to the output shaft 28 for a reduction drive of output shaft 28 from main shaft 26 through countershaft 60 as is well known in the prior art.

Synchronized clutch structure 140 is controlled by auxiliary section shift fork 142 axially moved by auxiliary section piston 144 controlled by the auxiliary section shift button 32 which may be selectively moved to the "H" position for the direct drive range or to the "L" position for the reduction driving connection between the main shaft and output shaft. Normally, piston 144 will position shift collar 140 in the full rightwardlymost position for gear reduction drive between the main and output shafts or to the full leftwardlymost position for direct drive connection between the main and output shafts.

The shift pattern for shifting transmission 12 may be seen by reference to FIG. 3. To engage the reverse speeds, shift rail 108 and shift fork 102 carried thereby are moved rightwardly as seen in FIG. 4. To engage first or sixth speed, shift rail 108 and shift fork 102 carried thereby are moved leftwardly as seen in FIG. 4. To engage second and seventh speed, or third and eight speed, respectively, shift rail 106 and shift fork 100 carried thereby is moved rightwardly or leftwardly, respectively, as seen in FIG. 4. To engage fourth and ninth speed, or fifth and tenth speed, respectively, shift rail 104 and shift fork 98 carried thereby is moved rightwardly or leftwardly, respectively, as seen in FIG. 4.

Each of the shift rails 104, 106 and 108 is provided with a pair of sensor ramp structures 146 and 148, 150 and 152, and 154 and 156, respectively, at axially spaced locations thereon, each of which ramp or notch structures cooperate with an individual two-position sensor which in combination form a portion of sensor/actuator assembly 52 to provide input signals to central processing unit 44 indicating when the transmission is in gear, when the transmission is in neutral and which, if any, ratio the operator has indicated a desire to engage. Each of the shift rails 104, 106 and 108 includes an interlock notch 162, 164 and 166, respectively, for cooperation with the standard interlock/neutral sensing mechanism to prevent displacement of more than one shift rail from the neutral position at any one time and to provide a signal of main section neutral condition. As will be described in greater detail below, the interlock/neutral sensing mechanism also may be utilized to prevent or inhibit movement of all of the shift rails until synchronous rotation of the members of a selected main section gear ratio positive clutch is accomplished.

In operation, to accomplish a gear change, the operator will disengage master clutch 16, and move the shift rail associated with the currently engaged gear ratio to the neutral position thereof to disengage the currently engaged gear ratio. Preferably, at that point in time, all of the shift rails will be inhibited from axial movement sufficient to engage any of the gear ratios in the main section 18 by means of an inhibiting mechanism acting on the interlock mechanism and the interlock notches 162, 164 and 166, as will be described in greater detail below. The operator will then attempt to move the shift rail associated with the jaw clutch assembly of the gear ratio desired to be engaged, sufficient uninhibited axial movement of which is allowed to cause one of the sensors to be displaced by one of the ramps 146-156, but not to axially engage that jaw clutch, thus providing a signal of the ratio desired to be engaged to the central processing unit 44. The central processing unit 44 will then determine, by means of the input signals from sensors 48 and 50, if the jaw clutch members of the jaw clutch associated with the desired ratio are synchronized and will actuate the power synchronizing assembly 10 to achieve and maintain such synchronization of the jaw clutch members. The control 44 will then release the shift rail blocking or inhibiting mechanism allowing uninhibited axial movement of the shift rail upon achievement of such synchronous rotation of the jaw clutch members.

As indicated above, the power synchronizer assembly 10 includes a planetary speed increasing gear set driven by the output shaft 28 independently of the rotational speed of the drive engine 14, and selectively actuatable to accelerate the rotational speed of the transmission elements driven by the input shaft 22 for purposes of synchronous rotation of jaw clutch member associated with the gear ratio to be engaged. Preferably, the power synchronizer assembly 10 will also include means to decelerate the transmission elements driven by the input shaft 22. Deceleration of the transmission elements driven by the input shaft may also be achieved by input shaft and/or engine braking devices which will preferably be controlled by central processing unit 44.

Power synchronizing mechanism 10 is especially configured for use with those compound transmissions comprising main section and auxiliary countershafts, 58 and 60, which are coaxially aligned. The structure of power synchronizing assembly 10 is relatively compact in both the axial and radial directions allowing same to be utilized with minimum modification to standard manual transmissions and further may allow power synchronizing mechanisms 10 to be supplied as aftermarket add-on accessories.

Auxiliary section countershaft 60 is provided with a throughbore 170 therethrough which is coaxial with a blind bore 172 provided in the rearward end of main section countershaft 58. Blind bore 172, opening to the rearward end of countershaft 58, is provided with internal splines. A sun gear shaft 174 carries a sun gear 176 fixed for rotation therewith at the rearward end thereof and extends forwardly through the bore 170 in auxiliary countershaft 60 and into the blind bore 172 in main section countershaft 58 and is provided with exterior splines for mating engagement with the interior splines provided in blind bore 172. Sun gear shaft 174 and sun gear 176 are thus fixed for rotation with main section countershaft 58 and all of the transmission elements rotating therewith, which elements include all of the clutch teeth 24a, 82a, 84a, 86a, 88a and 96a carried by the input gear 24 and all of the main shaft gears 82, 84, 86, 88 and 96. A planet carrier 178 is fixed for rotation with auxiliary countershaft 60 and carries a plurality of planet gears 180 constantly meshed with sun gear 176. Accordingly, whenever synchronized clutch 140 is engaged in either its rightwardmost or leftwardmost positions, auxiliary countershaft 60 and planet carrier 178 and the planet gears 180 carried thereby will be driven by the output shaft 28.

A ring gear 182 surrounds the planet carrier and is constantly meshed with the planet gears 180. Ring gear 182 is fixed to or integral with a ring gear carrier 184 which ring gear carrier is rotatably supported relative to housing 68, planet carrier 178 and sun gear shaft 174.

Ring gear carrier 184 and the ring gear 182 may be selectively frictionally grounded to the housing 68 by means of a band brake 186 grounded to housing 68 and selectively actuated to frictionally engage the ring gear carrier 184 by band brake actuator assembly 188 which is of conventional design. Preferably, the sun gear shaft 174 also carries a plurality of friction elements 190 for rotation therewith which friction elements may be selectively frictionally engaged with friction elements 192 rotationally fixed to housing 68 to frictionally ground the sun gear shaft 174 to housing 168 for purposed of selectively decelerating the input shaft driven transmission elements.

When central processing unit 44 senses that synchronization of a desired main section positive clutch requires acceleration of one of the input shaft driven clutch elements (24a, 82a, 84a, 86a, 88a); usually during a downshift, band brake actuator 188 will be actuated by a command signal to sensor/actuator 54 and band brake 186 will frictionally couple ring gear 182 to the transmission housing 68. With ring gear 182 thus grounded, the planet carrier 178 and planet gears 180, driven by output shaft 28, will drive sun gear 176, sun gear shaft 174 and main section countershaft 58 at an increased speed relative to the speed of output shaft 28.

By way of example, assume main section gears 24, 70, 78 and 88 have twenty eight (28), forty (40), twenty four (24) and forty six (46) teeth, respectively. Also, assume ring gear 182 has seventy (70) teeth, planet gears 180 have fourteen (14) teeth and sun gear 176 has forty two (42) teeth. Further, assume auxiliary section gears 124, 126, 128 and 130 have forty two (42), fifty one (51), fifteen (15) and forty two (42) teeth, respectively.

The main section situation requiring the greatest differential between input shaft 22 and mainshaft 26 speed is engagement of the highest ratio (i.e. the lowest speed) gear 88. The ratio of input shaft speed to mainshaft speed required to substantially synchronize clutch 88C, that is to cause clutch member 88A fixed to gear 88 to rotate at substantially the same speed as clutch member 88B rotationally fixed to mainshaft 26, is 2.74:1 (i.e. (40/28)×(46/24)).

In practice, for the type of jaw clutches utilized in heavy duty mechanical transmission 12, a positive clutch is considered substantially synchronized if the members thereof have no greater than a one hundred fifty (150) R.P.M. difference therebetween.

To accomplish the above, countershaft 58 must be caused to rotate at a 1.92:1 (i.e. 46/24) ratio relative to the mainshaft 26. Of course, sun gear 176 and sun gear shaft 174 are, in the illustrated embodiment, rotationally fixed to countershaft 58.

To engage sixth (6th) gear, when clutch 140 is in the leftward position to couple the output shaft 28 to the mainshaft 26 (high range), the rotational speeds of the mainshaft 26 and output shaft 28 are equal, and the auxiliary countershaft 60 and the planet carrier 178 will rotate at ratio of 1:1.21 (i.e. 51/42) relative to the output shaft. Thus, the maximum available ratio of power synchronizer 10 (i.e. the ratio of sun gear shaft 174 to planet carrier 178 rotational speeds) should be equal to or greater than 2.33:1 (i.e. 1.21×1.92).

To engage first (1st) gear, when clutch 140 is in the rightward position to couple gear 130 to output shaft 28 (low range) the same available power synchronizer ratio (2.33:1) is required. In low range, mainshaft 26 will rotate at a 3.4:1 (i.e. (42/15)×(51/42)) relative to the output shaft 28. Therefore, main section countershaft 58 must rotate at a ratio of 6.54:1 (3.4×1.92) relative to output shaft 28. The auxiliary countershaft 60 and the planet carrier 178 is driven at a 2.8:1 ratio (i.e. 42/15) relative to output shaft 28. Therefore, a power synchronizer ratio of 2.33:1 (i.e. 6.53/2.8) is required.

For planetary drive systems, the speeds of rotation about axis 208 may be calculated according to the formula:

$$N_C \times (T_R + T_S) = (N_S \times T_S) + (N_R \times T_R)$$

where
$N_C$ = speed of planet carrier,
$N_R$ = speed of ring gear,
$N_S$ = speed of sun gear,
$T_R$ = number of teeth on ring gear, and;
$T_S$ = number of teeth on sun gear.

In the present example, the maximum ratio of $N_S$ to $N_C$ (i.e. the power synchronizer ratio) occurs when the ring gear 182 is grounded (i.e. $N_R = 0$).

$$N_C(T_R + T_S) = N_S T_S$$

$$N_S/N_C = (T_R + T_S)/T_S$$

$$N_S/N_C = (70 + 42)/42$$

$$N_S/N_C = 2.67$$

To achieve exact synchronous rotation of clutch 88C, $N_S/N_C$ should equal 2.33. $N_S/N_C$ will equal 2.33 if the ring gear is allowed to rotate, or slip, by modulation of the brake band actuator 188 by the C.P.U.

$$N_C(T_R + T_S) = N_S T_S + N_R T_R$$

$$112 N_C = 42 N_S + 70 N_R$$

If $N_S = 2.33 N_C$ $$N_R = 0.20 N_C$$

Accordingly, in the present example, the ring gear 183 will be allowed to rotate at 20% of the rotational speed of the planet carrier 178.

In another example, assume the transmission 12 was operating in high range (clutch 140 in leftward position) and in 1.83:1 mainsection ratio and that a downshift to a 2.45:1 main section ratio from an initial input shaft speed of 1800 R.P.M. is selected. The input shaft speed required to create synchronous would be 2450 R.P.M. Typically, heavy duty diesel engines are governed at 2100 R.P.M. so engine speed manipulation could not achieve synchronous. The input shaft speed can easily be driven as high as 3100 R.P.M. by slowing the ring gear 182 of the power synchronizer 10 to a stop. For this particular shift, of course, the band brake 186 would be modulated to slip the ring gear 182 at a speed of 1137 R.P.M. to yield mainsection synchronous.

Figures 5, 5A:
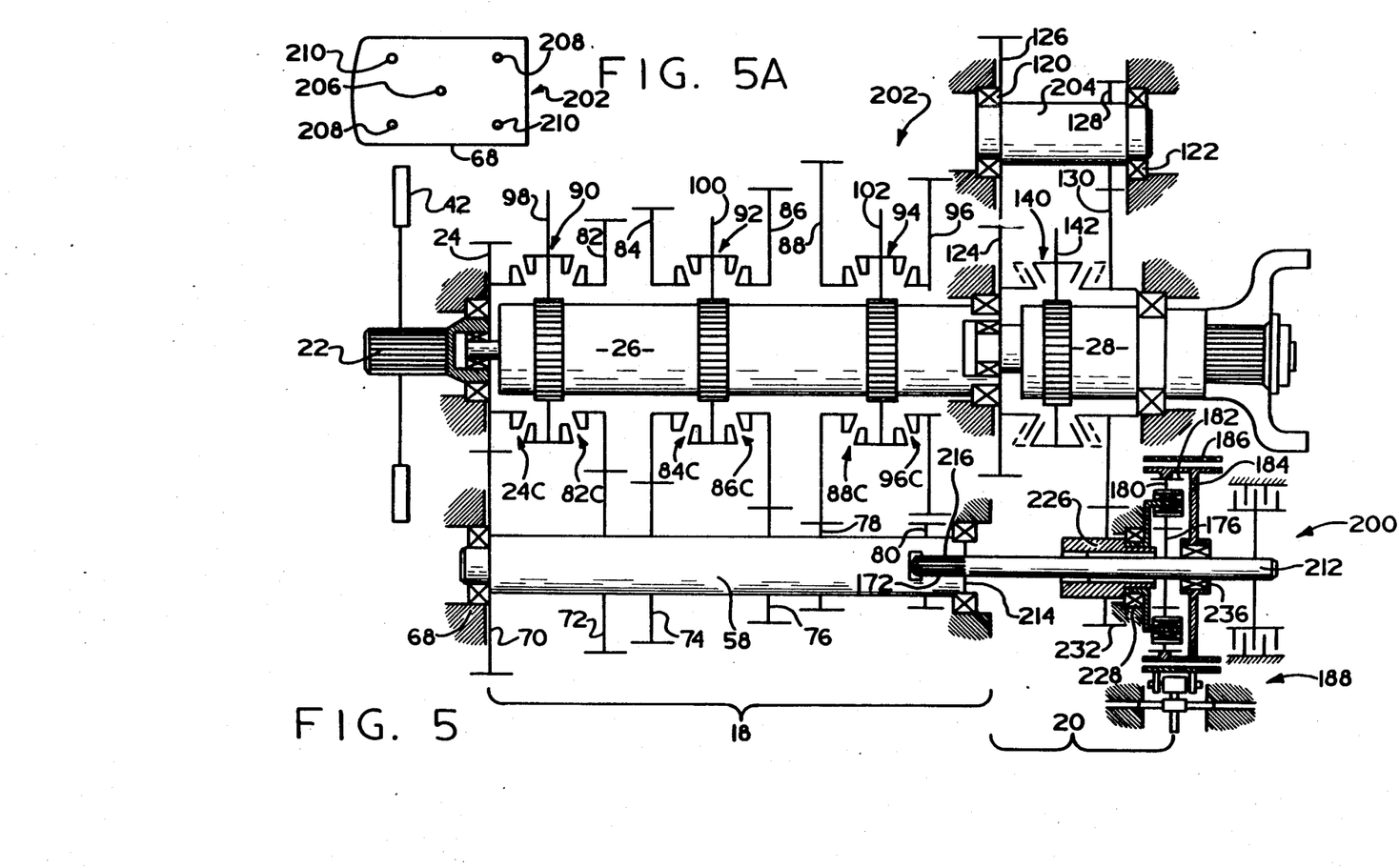
FIGS. 5 and 5A are schematic illustrations of an alternate embodiment of the power synchronizing mechanism of the present invention as utilized with a compound mechanical transmission of the type wherein the main and auxiliary section countershafts are not coaxially aligned.
Figure 6A:
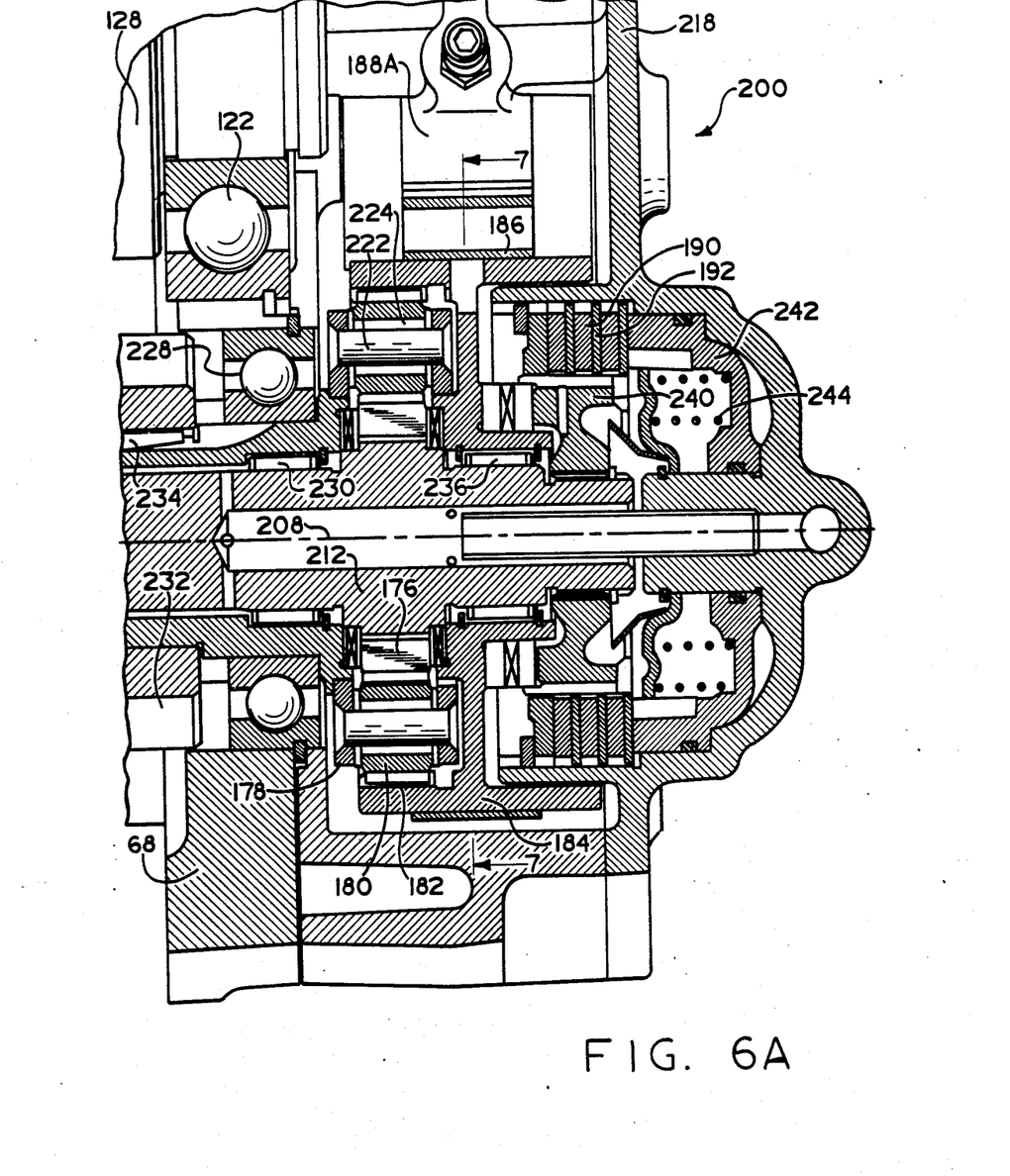
FIGS. 6A and 6B are partial side views in section, of the power synchronizing mechanism illustrated in FIG. 5.
Figure 6B:
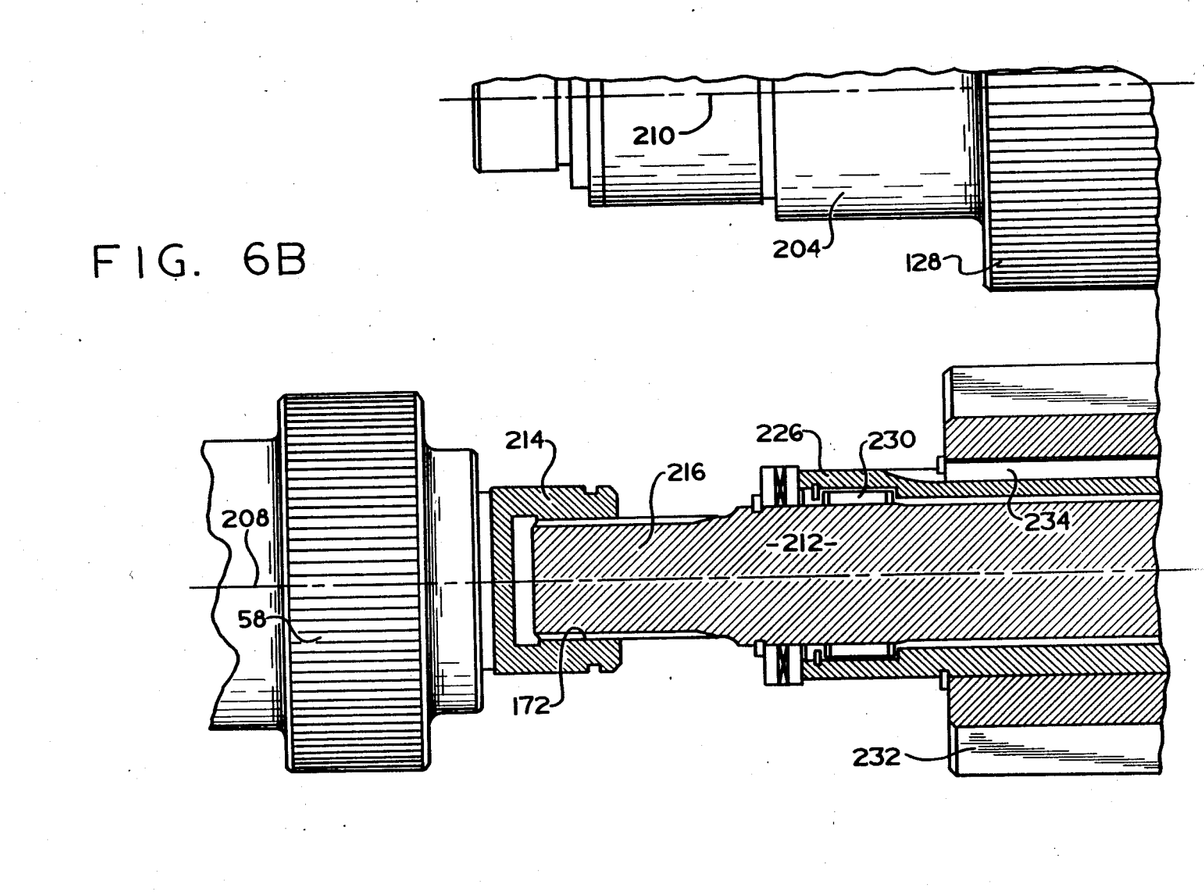
Figure 7:
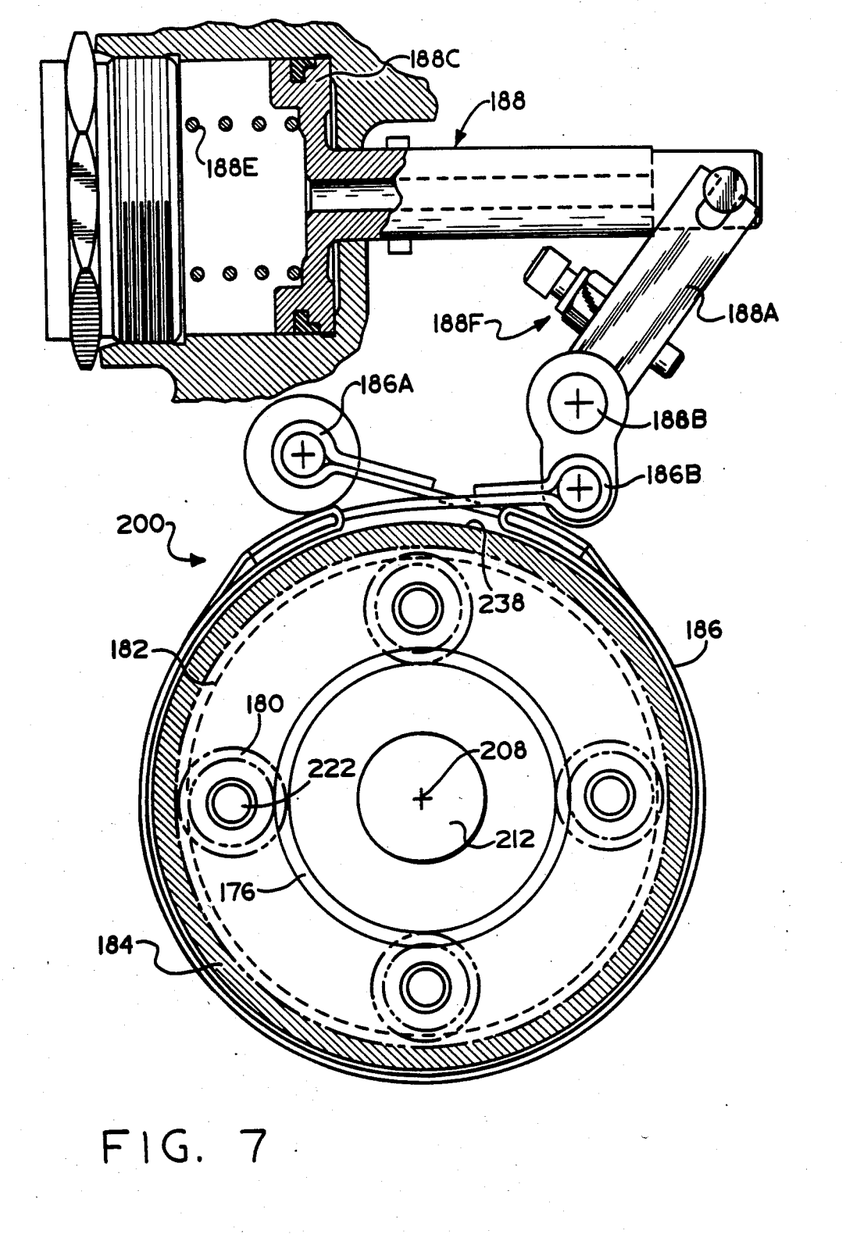
FIG. 7 is a front view, in section, taken along line 7—7 in FIG. 6A.

Another embodiment of the present invention, power synchronizer assembly 200, for use with a compound mechanical transmission 202, may be seen schematically by reference to FIG. 5 and in more structural detail by reference to FIGS. 6 and 7. Power synchronizer assembly 200 is similar to power synchronizer assembly 10 described above except that it is configured for use with a compound transmission 202, which is similar to transmission 12 described above except that the auxiliary section countershaft 204 is not coaxially aligned with the main section countershaft 58. Elements of power synchronizer assembly 200 and compound change gear transmission 202 which are identical, or substantially identical, to elements of power synchronizer assembly 10 and change gear transmission 12 described above, respectively, will be assigned like reference numbers.

Compound change gear mechanical transmissions wherein the main section countershafts 58 are not coaxially aligned with the auxiliary section countershafts 204 are well known in the prior art and may be seen by reference to U.S. Pat. Nos. 3,283,613; 3,799,002 and 4,492,196, the disclosures of which are hereby incorporated by reference. By way of example, referring to FIG. 5a, 206 may represent the axes of rotation of input shaft 22, main section 26 and output shaft 28 while 208 may represent the axes of rotation of main section countershaft 58 while 210 may represent the axes of rotation of auxiliary section countershaft 204. As will be described in greater detail below, 208 may also represent the axes of rotation of sun gear, planet carrier and ring gear of the power synchronizer assembly 200.

Referring to FIGS. 5 and 5a, auxiliary section countershaft 204 is rotatably supported in housing 68 by means of bearings 120 and 122 and carries auxiliary section countershaft gears 126 and 128 for rotation therewith, which auxiliary section countershaft gear are meshingly engaged with auxiliary section drive gear 124 and output gear 130. Auxiliary section drive gear 124 and output gear 130 may be selectively clutched to output shaft 28 by means of conventionally synchronized jaw clutch assembly 140 as described above and well known in the prior art. As with change gear transmission 12 described above, one of the main section countershafts 58 is provided with a blind bore 172 at the rearward end 214 thereof, which blind bore is provided with internal splines for driving engagement with external splines provided on the forward end 216 of sun gear shaft 212. Accordingly, when sun gear shaft 212 is received within the blind bore 172 in main section countershaft 58 with the splines engaged, shafts 58 and 212 are joined for joint rotation about axis 208. Sun gear shaft 212 is formed integrally with a sun gear 176, which sun gear 176 is in constant meshing engagement with a plurality of planet gears 180 carried by a planet carrier 178. Planet carrier 178 carries the planet gears by means of planet gear shafts 222 and needle bearings 224 as is well known in the prior art. Planet carrier 178 is fixed for rotation with a planet carrier sleeve 226 which sleeve is rotatably supported in housing 68 by means of bearings 228 and which sleeve surrounds and rotatably supports sun gear shaft 212 by means of a plurality of needle bearings 230. A planet carrier drive gear 232 is fixed for rotation with planet carrier sleeve 226 as at spline connection 234 comprising external splines provided on sleeve 226 and internal splines provided on gear 232. Planet carrier drive gear 232 is in meshing engagement with output gear 130 and thus will be driven directly or indirectly, respectively, by the output shaft 28 whenever the synchronized clutch mechanism is in the full rightwardly or leftwardly, respectively, positions thereof.

A ring gear 182 surrounds and is in constant meshing engagement with the planet gears 180 and is supported by a ring gear carrier 184 supported for rotation on sun gear shaft 212 by means of needle bearings 236. A band brake 186 surrounds the outer periphery 238 of ring gear carrier 184 and may be selectively actuated, that is tightened radially inwardly about the outer periphery of the ring gear carrier 184, to ground the ring gear carrier 184 and ring gear 182 to the housing 68 by means of band brake actuator assembly 188.

Briefly, brake band 186 includes a first end 186a fixed to housing 68 and a second end 186b fixed to a lever 188a pivoted at 188b to the housing 68. A pressurized fluid actuated piston 188c is slidingly and sealingly received in a cylinder 188d defined in housing 68 and, in combination with return spring 188e, engages an end of the lever 188a to pivot lever 188a from, and return lever 188 to, the pivotal position shown in FIG. 7 for engaging and releasing, respectively, the band brake. Of course, other types of band brake actuation mechanism are known in the prior art and are intended to fall within the scope of the present invention.

Preferably, the sun gear shaft 212 will carry a plurality of friction elements 190 by means of a carrier 240 which friction elements are interleaved with friction elements 192 carried by rear cover 218 of housing 68. A fluid acutated piston 242 and return spring 244 are provided for selectively frictionally engaging and disengaging, respectively, friction elements 190 and 192 to selectively frictionally engage sun shaft 212 and main section countershaft 58 to the housing 68 for purposes of decelerating the input shaft driven jaw clutch members as may be required to achieve synchronization.

The operation of the power synchronizing mechanisms 10 and 200 are identical. The advantages of power synchronizing assemblies 10 and 200 are that the assemblies, i.e. the planetary drive train and brake band combination, can be added to the host transmission, conceivably as an add-on device, without reducing the number of available drive ratios of the host transmission, the brake band 186 and brake band actuator assembly 188 combination is not a rotational device and thus does not have the drawbacks of requiring rotational seals or bearing means between pistons and reaction plates, the brake band actuator 188 is an assymetrical device which may be oriented to any rotational position that is most convenient for the host transmission without adding substantially to the length of the host transmission, the brake band can be made self-energizing and has the advantage of operating at the largest available diameter relative to the ring gear thus maximizing the torque developed and the friction surfaces available to absorb energy. Additionally, power synchronizer assembly 10 or 200 is such that an upshift brake, i.e. friction elements 190 and 192, can be neatly nested into the ring gear - ring gear carrier creating the potential for an add-on microprocessor controlled power synchronizer assembly for both upshifting and downshifting controlled by a microprocessor without requiring the microprocessor to also control such additional devices such as input shaft brakes, engine brakes and the like.

Figure 8:
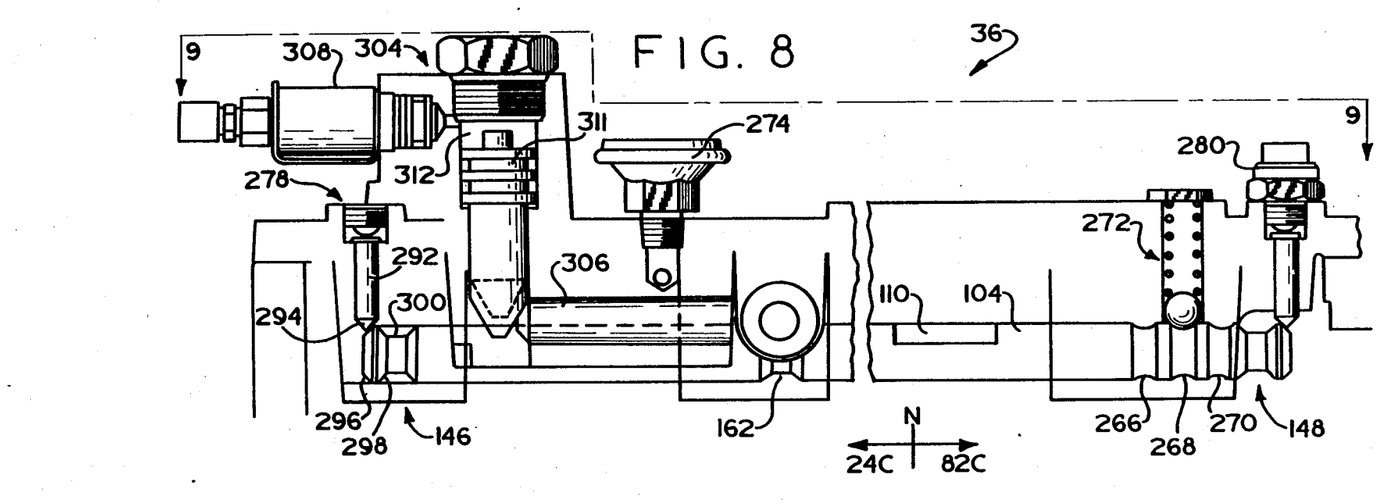
FIG. 8 is a partial side view, in section, of the shift bar housing assembly of the semi-automatic transmission in FIG. 1.
Figure 9:
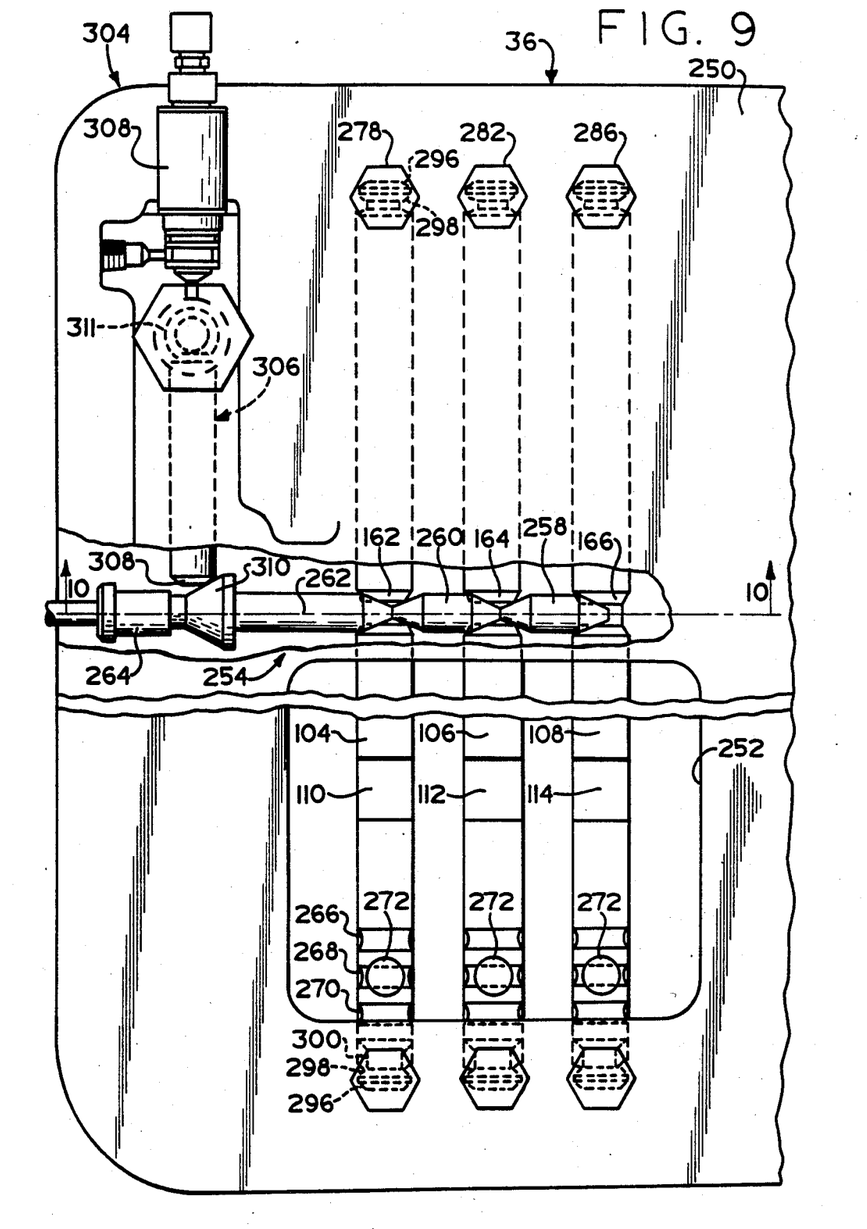
FIG. 9 is a top view taken along the line 9—9 in FIG. 8.
Figure 10:
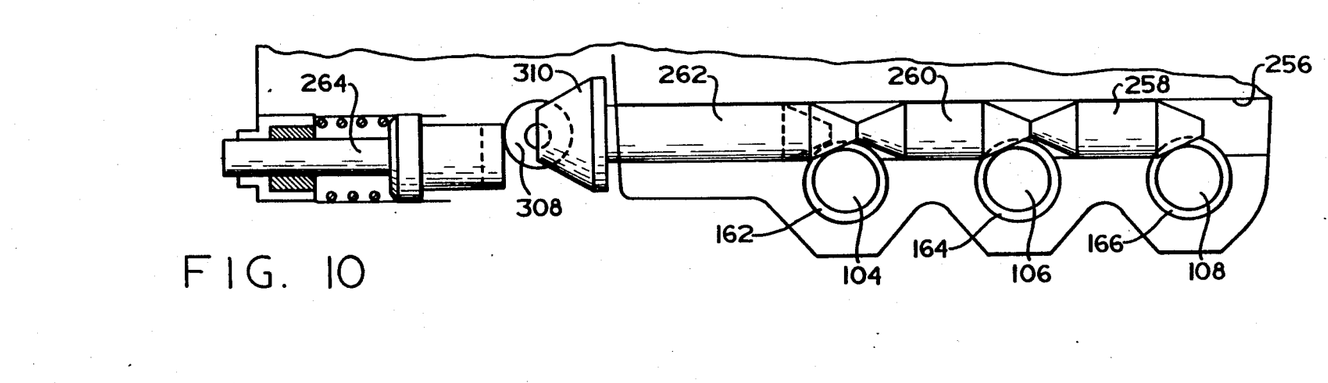
FIG. 10 is a front view in section taken along the line 10—10 in FIG. 9.

The structure of the shift bar housing assembly 36 and selection sensor/shift rail inhibitor actuator assembly 52, which are used to control the shifting of main transmission section 18, may be seen in greater detail by reference to FIGS. 8, 9 and 10. Shift bar housing assembly 36 includes a shift bar housing 250 which is mountable to the transmission housing 68. The shift bar housing 250 includes an upper opening 252 therethrough at which may be mounted a conventional shift lever tower assembly, or a remotely controlled shift assembly, for manual manipulation of the shift rails 104, 106 and 108 by engagement of the shift notches 110, 112 and 114, respectively, provided therein. It is understood, that other forms of shift notches and/or shift block structures for cooperation with other types of shift levers and/or shift shafts may be used to selectively axially move a selected one of the shift rails 104, 106 and 108 and such structures are well suited for use in the present invention. Central processing unit 44 may also be mountable directly to the shift rail housing 250.

Each of the shift rails, 104 106 and 108, is also provided with an interlock notch 162, 164 and 166, respectively, for cooperation with a standard neutral interlock/neutral sensing assembly 254. The use of interlock notches 162, 164 and 166 in combination with the interlock/neutral sensing assembly 254 is well known in the prior art and provides two important functions; namely, prevention of axial movement of more than one at a time of the shift rails from the neutral positions thereof and providing a signal that all of the main section shift rails are in the neutral position, which signal is utilized for controlling shifting of the auxiliary section. Interlock and/or neutral sensing mechanisms of various structures, usually comprising axially movable shafts, plungers and the like generally transversely oriented to the axis of the shift rails, are well known in the prior art and examples thereof may be seen by reference to U.S. Pat. Nos. 4,445,393; 4,406,356; 4,440,037; 4,120,212; 3,387,501; 4,273,004 and 4,296,642, the disclosures of which are hereby incorporated by reference.

Briefly, for the interlock/neutral sensing function of transmission 12, housing 250 is provided with an interlock bore 256 extending generally transverse the axes of the shift rails 104, 106 and 108. Each of the interlock notches 162, 164 and 166 will coaxially align with bore 256 when the shift rail associated therewith, 104, 106 and 108, respectively, is in the neutral or axially nondisplaced position thereof. A pair of interlock plungers 258 and 260 interact with the taper surfaces of the interlock notches or grooves to allow axial movement of only one shift rail at a time from the neutral position thereof. A neutral sensor piston or plunger 262 cooperates with the interlock notches and interlock plungers and will be displaced axially outwardly whenever any one of the shift rails is axially displaced from the neutral position thereof. Preferably, neutral sensing plunger 262 is biased axially inwardly and cooperates with plunger 264 of a two position sensor to provide a signal indicative of the main transmission section 18 being, or not being, in the neutral condition thereof. Each of the shift rails may also be provided with a plurality of detent notches 266, 268, 270 for cooperation with a spring biased detent assembly 272 for maintaining the shift rails in the selected in-gear or neutral positions thereof. The shift rail housing assembly 36 may also be provided with one or more breathers 274 as is known.

The above discussed structural features of shift rail housing assembly 36 are well known and standard components for manual non-synchronized compound mechanical change gear transmissions. For purposes of providing a semi-automatic transmission system, to the standard structure is added a pair of two position sensors 278 and 280, 282 and 284, 286 and 290 for each shift rail. Sensors 278, 280, 282, 284, 286 and 290 cooperate with the sensor notch or ramp structures 146, 148, 150, 152, 154 and 156, respectively, provided on shift rails 104, 106 and 108. Each of the two position sensors cooperates with its associated sensor ramp structure in a substantially identical manner and only one such combination will be described in detail.

Each sensor is provided with an inwardly extending axially moveable plunger 292 which extends inwardly toward the sensor ramp structure associated therewith.

Each sensor plunger is provided with a tapered tip 294 for cooperation with substantially complimentary surfaces 296 and 298 provided on the ramp structure. Ramp surfaces 296 and/or 298 will engage the tip 294 of plunger 292 of the sensor associated therewith and outwardly displaced same whenever the shift rail is axially displaced to an axial position inbetween the neutral axially nondisplaced or centered position of the rail and the fully axially displaced in one direction only position of the rail whereat one of the positive clutches is fully engaged. Accordingly, axial movement of a shift rail, and of the shift fork and jaw clutch member carried thereby from the neutral position towards engagement of a particular gear, or from full engagement of a particular gear towards the neutral position, will result in a signal from the two position sensor associated therewith. When the shift rail is in the neutral position or in a fully axially displaced position corresponding to engagement of one of the positive clutches associated therewith, the sensors will not provide a signal indicative of outward displacement of the plunger members thereof.

By way of example, referring to FIG. 8, shift rail 104 carries shift fork 98 for axial movement therewith and may be axially displaced from the position illustrated leftwardly to engage positive clutch 24c or rightwardly to engage postitive clutch 82c. Two position sensor 278 is associated with clutch 24c and two position sensor 280 is associated with clutch 82c.

Assuming the two position sensors provide a signal when and only when the plungers thereof are displaced outwardly, the function thereof will be described below. Referring to FIG. 8, in the position shown shift rail 104 is in the axially nondisplaced or neutral position, and the plungers of sensors 278 and 280 are not displaced and thus will not provide a signal. The absence of signals from sensors 278 and 280 indicates to the control 44 that as to shift rail 104, the transmission is in neutral or that one of clutches 4c or 82c is fully engaged. If the shift rail 104 is moved leftwardly plunger 292 will be outwardly displaced causing sensor 278 to provide a signal while sensor 280 will not provide a signal as its plunger will not be outwardly displaced. A signal from sensor 278 indicates to the control logic that one of two events is occuring, either the transmission is being shifted from neutral to engage positive clutch 24c or the transmission is being shifted from full engagement of clutch 24c into the neutral position. Accordingly, by use of the axially displaced pair of two position sensors and cooperating sensor ramps, a signal will be provided indicating to the control logic that either engagement of disengagement of a specific positive clutch is being attempted by the vehicle operator. Of course, for those shift rails controlling a single clutch only, only a single sensor/ramp combination is required. The sensors and associated ramps, in combination, thus provide an assembly for sensing which particular mainsection gear the operator has selected to manually engage or disengage.

It is understood that the absence of a signal from a particular two-position sensor may be considered a first signal therefrom indicating the sensor is in the first position thereof while the pressure of a signal from that sensor may be considered a second signal indicating the sensor is in the second position thereof.

Upon sensing that engagement or disengagement of a particular clutch is being attempted, the central processing unit 44 will command two actions, synchronization of the jaw clutch members of the positive clutch involved and inhibiting axial movement of the shift rail until achievement and/or maintenance of such synchronization is sensed. Of course, in the case of moving from a fully engaged positive clutch position to a neutral position, synchronization will already have been achieved and thus the inhibiting mechanism will be applied only momentarily, if at all. Preferably, in the absence of all signals, which is an indication that one of the positive clutches is fully engaged or that the transmission is in neutral, the inhibiting mechanism will also be actuated.

The structure for selectively inhibiting axial movement of the shift rails is relatively simple, preferably cooperates with the existing neutral interlock/neutral sensing assembly 254 and is controlled by the central processing unit 44. The inhibiting structure, when actuated, will allow sufficient axial free play of the shift rail to allow the surfaces 296 or 298 of the sensor ramp associated with a particular gear to outwardly displace the sensor plunger 292 associated with the selected particular gear, but will resiliently inhibit axial movement sufficient to engage a selected previously disengaged gear.

The shift rail inhibiting structure 304 required to be added to existing standard transmission structure includes an axially moveable rod member 306 having a tapered tip 308 which will cooperate with a complimentary tapered surface 310 provided on the neutral indicator piston 262 and, in one axial position thereof, resiliently biases the indicator piston 262 inwardly to inhibit axial movement of all of the shift rails 104, 106 and 108 from at least the axially centered to the axially displaced positions thereof. In its other axial position, upwardly from the position illustrated in FIG. 9, inhibiting rod 306 will not in any way interfer with the normal action of the interlock and neutral sensing assembly 254. Inhibiting rod 306 is resiliently caused to assume its first position by means of a solenoid controlled valve 308 and a inhibitor actuator piston 311. The solenoid controlled valve 308 is, of course, controlled by central processing unit 44. The cooperating ramp angles of members 310 and 308, and also the ramp angles on actuating piston 311 cooperating with a ramp on 306, in combination with the fluid pressure in piston portion 312 controlled by solenoid valve 308, are so selected such that rod 306 may, by lever 30, be forced to its second position thereof whereby mechanism 304 inhibits but does not prohibit shifting of the shift rails to provide the operator with the ability to complete a shift even in the absence of synchronization and/or in the event of a system failure to provide a limp-home or pull-off-the-road capability.

While plunger or rod 306 could be directly fluidly actuated by the solenoid valve 308, the illustrated structure is preferred for purposes of easing servicing and maintenance of the inhibit mechanism 304. Also, the inhibiting mechanism could act directly on interlock plungers 258 or 260.

By utilizing a pair of spaced sensors and cooperating pair of sensor ramp structures for each shift rail, the use of relatively simple two-position (on-off) sensors is permitted. Of course, by utilizing a more complicated sensor and sensor ramp structure, a single sensor per rail could be utilized.

The sensor/actuator 52 provides a signal to the central processing unit 44 indicative that the operator has caused initiation of an axial movement of a shift rail involving a movement from neutral into engagement of a particular gear or movement from engagement of that particular gear into neutral. Of course, receipt of a signal from more than one selection sensor at a given time would be an error signal.

The central processing unit 44 is provided with logic such that in the absence of all signals, which absence of signals indicates that the main transmission section 18 is either in neutral or fully engaged in one of the gear ratios, the inhibit mechanism 304 is actuated to inhibit movement of the shift rails from the current positions thereof. It is understood, that when in gear or when in neutral, the neutral interlock and/or inhibit mechanism, while preventing or inhibiting axial movement of the shift rails, will not prohibit or inhibit movement of the shift rails sufficient to cause actuation (i.e. outward displacement) of the sensors. Upon receiving a signal from one of the sensors indicating that engagement or disengagement of a particular gear has been initiated, the speeds of the jaw clutch members associated with that gear ratio are calculated to determine if synchronous rotation therebetween has been achieved. While such synchronous rotation is sensed, the inhibit mechanism is deactuated until the signal from that sensor ceases indicating that that gear ratio has been fully engaged or that the transmissionis in neutral. If synchronous rotation is not sensed, the central processing unit 44 will actuate the power synchronizing assembly 10 (and/or an input shaft or input brake assembly) to achieve and maintain synchronous rotation and then the inhibit mechanism will be deactuated.

As may be appreciated, in the illustrated embodiment, actuation of the inhibiting or blocking means when the main section 18 is fully engaged in any one of the selectable ratios will not significantly inhibit disengagement of the engaged ratio gear. However, by utilizing logic wherein the blocking means is actuated in the absence of all signals from the two-position sensor, the potential for causing an error in logic performance by moving from the nondisplaced position to an intermediate position and then back to the nondisplaced position instead of into engagement is eliminated.

Although the present invention has been described with a certain degree of particularity, it is understood that various components thereof may be substituted for and/or rearranged without departing from the spirit and the scope of the present invention as hereinafter claimed.

We claim:

1. A power synchronizer assembly for use with a mechanical change gear transmission of the type comprising a transmission housing, an input shaft rotatably supported in said housing and driven by an engine through a nonpositive coupling, an output shaft rotatably supported in said housing and a plurality of selectable ratio gears selectively engageable one at a time to a first transmission element by means of positive, nonsynchronized jaw clutch assemblies for providing a plurality of selectable drive ratios between said input and output shafts, each of said jaw clutch assemblies comprising a first jaw clutch member rotatably associated with said first transmission element and a second jaw clutch member rotatably associated with a second transmission element, each of said ratio gears rotatably fixed to one of said second jaw clutch members, said power synchronizer assembly selectively actuatable for selectively varying the rotational speed of said second transmission element and the second jaw clutch members rotatably associated therewith independently of the rotational speed of said engine, said power synchronizer assembly characterized by:

a sun gear shaft rotatably supported in said housing and rotatably associated with said second transmission element;

a sun gear fixed for rotation on said sun gear shaft;

a plurality of planet gears surrounding said sun gear and constantly meshingly engaged therewith;

a planet carrier rotatably supporting said planet gears, said planet carrier rotatably supported for rotation relative to said housing and said sun gear;

means for drivingly coupling said planet carrier to said output shaft;

a ring gear surrounding said planet gears and constantly meshingly engaged therewith, said ring gear normally supported for rotation relative to said housing, sun gear and planet carrier; and selectively actuated power synchronizer assembly operating means for selectively rotationally coupling said ring gear to said housing.

2. The power synchronizer assembly of claim 1, wherein said power synchronizer assembly operating means comprises friction means for rotatably coupling said ring gear to said housing.

3. The power synchronizer assembly of claim 2, wherein said ring gear is supported by a ring gear carrier defining a generally annular outer surface and said operating means comprises a brake band surrounding said generally annular outer surface and selectively radially inwardly constrictable to frictionally engage same.

4. The power synchronizer assembly of claim 3, wherein $(N_S/N_C) \times (N_C/N_O) \times (N_2/N_S)$ is at least substantially equal to or greater than $(N_2/N_1) \times (N_1/N_O)$ where:

5. The power synchronizer assembly of claim 2, wherein said first transmission element comprises a main shaft and said second transmission element includes a countershaft constantly driven by said input shaft and a plurality of countershaft gears fixed for rotation with said countershaft and constantly meshed with said ratio gears.

6. The power synchronizer assembly of claim 5 wherein said sun gear shaft is coaxial with said countershaft.

7. The power synchronizer assembly of claim 6, wherein said sun gear shaft is fixed for rotation with said countershaft.

8. The power synchronizer assembly of claim 7, wherein said sun gear shaft is provided with external splines thereon for mating engagement with internal splines provided in a recess in said countershaft.

9. The power synchronizer assembly of claim 6, wherein said ring gear is supported by a ring gear carrier defining a generally annular outer surface and said operating means comprises a brake band surrounding said generally annular outer surface and selectively radially inwardly constrictable to frictionally engage same.

10. The power synchronizer assembly of claim 5, wherein said first jaw clutch members comprise collars splined to said main shaft for rotational movement therewith and selective axial movement relative thereto.

11. The power synchronizer assembly of claim 10, wherein said second jaw clutch elements comprise gear teeth integral with said ratio gears.

12. The power synchronizing assembly of claim 5, wherein said power synchronizer assembly operating means additionally comprises means for selectively rotationally frictionally coupling said sun gear to said housing.

13. The power synchronizer assembly of claim 12, wherein $(N_S/N_C) \times (N_C/N_O) \times (N_2/N_S)$ is at least substantially equal to or greater than $(N_2/N_1) \times (N_1/N_O)$ where:
$N_S/N_C =$ the ratio of sun gear rotational speed to planet carrier rotational speed,
$N_C/N_O =$ the ratio of planet carrier rotational speed to output shaft rotational speed,
$N_2/N_S =$ the ratio of second transmission element rotational speed to sun gear rotational speed,
$N_2/N_1 =$ the greatest ratio of second transmission element rotational speed to first transmission element rotational speed required to achieve synchronous rotation of any of said jaw clutch assemblies; and
$N_1/N_O =$ the ratio of first transmission element rotational speed to output shaft rotational speed.

14. The power synchronizer assembly of claim 5, wherein said ring gear is supported by a ring gear carrier defining a generally annular outer surface and said operating means comprises a brake band surrounding said generally annular outer surface and selectively radially inwardly constrictable to frictionally engage same.

15. The power synchronizer assembly of claim 14, wherein $(N_S/N_C) \times (N_C/N_O) \times (N_2/N_S)$ is at least substantially equal to or greater than $(N_2/N_1) \times (N_1/N_O)$ where:
$N_S/N_C =$ the ratio of sun gear rotational speed to planet carrier rotational speed,
$N_C/N_O =$ the ratio of planet carrier rotational speed to output shaft rotational speed,
$N_2/N_S =$ the ratio of second transmission element rotational speed to sun gear rotational speed,
$N_2/N_1 =$ the greatest ratio of second transmission element rotational speed to first transmission element rotational speed required to achieve synchronous rotation of any of said jaw clutch assemblies; and
$N_1/N_O =$ the ratio of first transmission element rotational speed to output shaft rotational speed.

16. The power synchronizer assembly of claim 5, wherein $(N_S/N_C) \times (N_C/N_O) \times (N_2/N_S)$ is at least substantially equal to or greater than $(N_2/N_1) \times (N_1/N_0)$ where:
$N_S/N_C =$ the ratio of sun gear rotational speed to planet carrier rotational speed,
$N_C/N_O$ the ratio of planet carrier rotational speed to output shaft rotational speed,
$N_2/N_S =$ the ratio of second transmission element rotational speed to sun gear rotational speed,
$N_2/N_S =$ the greatest ratio of second transmission element rotational speed to first transmission element rotational speed required to achieve synchronous rotation of any of said jaw clutch assemblies; and
$N_1/N_0 =$ the ratio of first transmission element rotational speed to output shaft rotational speed.

17. The power synchronizer assembly of claim 2, wherein said mechanical change gear transmission comprises a compound transmission having a main transmission section coupled in series with an auxiliary transmission section, said first transmission element comprising the main transmissions section main shaft and said second transmission element comprising a main section countershaft driven by said input shaft, a plurality of main section countershaft gears fixed for rotation on said main section countershaft and constantly meshed with said ratio gears, said auxiliary transmission section including at least one auxiliary section countershaft driven by said main shaft, said sun gear shaft coupled for driving engagement with said main section countershaft.

18. The power synchronizer assembly of claim 17, wherein said sun gear shaft and said main section countershaft are coaxial.

19. The power synchronizer assembly of claim 18, wherein said main section and auxiliary section countershafts are coaxially aligned and said sun gear shaft extends through a through bore provided in said auxiliary section countershaft.

20. The power synchronizer assembly of claim 19, wherein said means for coupling said planet carrier to said output shaft comprises a planet carrier gear fixed for rotation with said planet carrier and constantly meshed with an output shaft gear fixed for rotation with said output shaft.

21. The power synchronizer assembly of claim 20, wherein said ring gear is supported by a ring gear carrier defining a generally annular outer surface and said operating means comprises a brake band surrounding said generally annular outer surface and selectively radially inwardly constrictable to frictionally engage same.

22. The power synchronizer assembly of claim 19, wherein said ring gear is supported by a ring gear carrier defining a generally annular outer surface and said operating means comprises a brake band surrounding said generally annular outer surface and selectively radially inwardly constrictable to frictionally engage same.

23. The power synchronizer assembly of claim 18, wherein said means for drivingly coupling said planet carrier to said output shaft will constantly couple said carrier to said output shaft.

24. The power synchronizer assembly of claim 17, wherein said first jaw clutch members comprise collars splined to said main shaft for rotational movement therewith and selective axial movement relative thereto.

25. The power synchronizer assembly of claim 24, wherein said second jaw clutch elements comprise gear teeth integral with said ratio gears.

26. The power synchronizing assembly of claim 17, wherein said power synchronizer assembly operating means additionally comprises means for selectively rotationally frictionally coupling said sun gear to said housing.

27. The power synchronizer assembly of claim 26, wherein said means for frictionally coupling said sun gear to said housing comprises a plurality of first friction discs fixed for rotation to said housing and a plurality of second friction discs fixed for 28. The power synchronizer assembly of claim 27, wherein said ring gear is supported by a ring gear carrier defining a generally annular outer surface and said operating means comprises a brake band surrounding said generally annular outer surface and selectively radially inwardly constrictable to frictionally engage same.

29. The power synchronizer assembly of claim 17, wherein said ring gear is supported by a ring gear carrier defining a generally annular outer surface and said operating means comprises a brake band surrounding said generally annular outer surface and selectively radially inwardly constrictable to frictionally engage same.

30. The power synchronizer assembly of claim 29, wherein $(N_S/N_C) \times (N_C/N_O) \times (N_2/N_S)$ is at least substantially equal to or greater than $(N_2/N_1) \times (N_1/N_O)$ where:

$N_S/N_C$ = the ratio of sun gear rotational speed to planet carrier rotational speed, $N_C/N_O$ = the ratio of planet carrier rotational speed to output shaft rotational speed, $N_2/N_1$ = the ratio of second transmission element rotational speed to sun gear rotational speed, $N_2/N_S$ = the greatest ratio of second transmission element rotational speed to first transmission element rotational speed required to achieve synchronous rotation of any of said jaw clutch assemblies; and $N_1/N_O$ = the ratio of first transmission element rotational speed to output shaft rotational speed.

31. The power synchronizer assembly of claim 17, wherein $(N_S/N_C) \times (N_C/N_O) \times (N_2/N_S)$ is at least substantially equal to or greater than $(N_2/N_1) \times (N_1/N_O)$ where:

$N_S/N_C$ = the ratio of sun gear rotational speed to planet carrier rotational speed, $N_C/N_O$ = the ratio of planet carrier rotational speed to output shaft rotational speed, $N_2/N_S$ = the ratio of second transmission element rotational speed to sun gear rotational speed, $N_2/N_1$ = the greatest ratio of second transmission element rotational speed to first transmission element rotational speed required to achieve synchronous rotation of any of said jaw clutch assemblies; and $N_1/N_O$ = the ratio of first transmission element rotational speed to output shaft rotational speed.

32. The power synchronizing assembly of claim 1, wherein said power synchronizer assembly operating means additionally comprises means for selectively rotationally frictionally coupling said sun gear to said housing.

33. The power synchronizer assembly of claim 32, wherein said means for frictionally coupling said sun gear to said housing comprises a plurality of first friction discs fixed for rotation to said housing and a plurality of second friction discs fixed for rotation with said sun gear shaft and interleaved with said first friction discs, said first and second friction discs received within the circumferential space defined by said ring gear.

34. The power synchronizer assembly of claim 33, wherein said ring gear is supported by a ring gear carrier defining a generally annular outer surface and said operating means comprises a brake band surrounding said generally annular outer surface and selectively radially inwardly constrictable to frictionally engage same.

35. The power synchronizer assembly of claim 34, wherein $(N_S/N_C) \times (N_C/N_O) \times (N_2/N_S)$ is at least substantially equal to or greater than $(N_2/N_1) \times (N_1/N_O)$ where:

$N_S/N_C$ = the ratio of sun gear rotational speed to planet carrier rotational speed, $N_C/N_O$ = the ratio of planet carrier rotational speed to output shaft rotational speed, $N_2/N_S$ = the ratio of second transmission element rotational speed to sun gear rotational speed, $N_2/N_1$ = the greatest ratio of second transmission element rotational speed to first transmission element rotational speed required to achieve synchronous rotation of any of said jaw clutch assemblies; and $N_1/N_O$ = the ratio of first transmission element rotational speed to output shaft rotational speed.

36. The power synchronizer assembly of claim 32, wherein said ring gear is supported by a ring gear carrier defining a generally annular outer surface and said operating means comprises a brake band surrounding said generally annular outer surface and selectively radially inwardly constrictable to frictionally engage same.

37. The power synchronizer assembly of claim 1, wherein $(N_S/N_C) \times (N_C/N_O) \times (N_2/N_S)$ is substantially equal to or greater than $(N_2/N_1) \times (N_1/N_O)$ where:

$N_S/N_C$ = the ratio of sun gear rotational speed to planet carrier rotational speed, $N_C/N_O$ = the ratio of planet carrier rotational speed to output shaft rotational speed, $N_2/N_S$ = the ratio of second transmission element rotational speed to sun gear rotational speed, $N_2/N_1$ = the greatest ratio of second transmission element rotational speed to first transmission element rotational speed required to achieve synchronous rotation of any of said jaw clutch assemblies; and $N_1/N_0$ = the ratio of first transmission element rotational speed to output shaft rotational speed.

* * * * *